(12) United States Patent
Goino

(10) Patent No.: US 9,403,685 B2
(45) Date of Patent: Aug. 2, 2016

(54) APPARATUS FOR PRODUCING CARBON NANOMATERIAL, AND USE THEREOF

(75) Inventor: Tadashi Goino, Azumino (JP)

(73) Assignee: ENVIRONMENT ENERGY NANO TECHNICAL RESEARCH INSTITUTE, Nagano (JP)

( * ) Notice: Subject to any disclaimer, the term of this patent is extended or adjusted under 35 U.S.C. 154(b) by 54 days.

(21) Appl. No.: 14/111,389

(22) PCT Filed: Apr. 13, 2012

(86) PCT No.: PCT/JP2012/060171
§ 371 (c)(1),
(2), (4) Date: Nov. 22, 2013

(87) PCT Pub. No.: WO2012/141307
PCT Pub. Date: Oct. 18, 2012

(65) Prior Publication Data
US 2014/0072504 A1 Mar. 13, 2014

(30) Foreign Application Priority Data
Apr. 15, 2011 (JP) .................................. 2011-091502

(51) Int. Cl.
*C01B 31/02* (2006.01)
*B82Y 30/00* (2011.01)
(Continued)

(52) U.S. Cl.
CPC ........... *C01B 31/0293* (2013.01); *B01J 20/205* (2013.01); *B01J 20/28028* (2013.01);
(Continued)

(58) Field of Classification Search
CPC C01B 31/0293; C01B 31/0206; B82Y 30/00; B82Y 40/00; C01P 2002/82; C01P 2002/88; C01P 2004/16; C01P 2004/64; B01J 20/28028; B01J 20/3078; B01J 20/3234; B01J 20/3293; B01J 20/3295; B01J 20/28045; B01J 20/205

See application file for complete search history.

(56) References Cited

U.S. PATENT DOCUMENTS 8,444,333 B2 * 5/2013 Suzuki .................. B01D 29/56
396/611
2002/0127351 A1 9/2002 Takikawa et al.
(Continued)

FOREIGN PATENT DOCUMENTS

JP 3044280 B2 5/2000
JP 2001-064004 A 3/2001
(Continued)

OTHER PUBLICATIONS

Sano et al., "Synthesis of carbon nanohorns by a gas-injected arc-in-water method and application to catalyst-suport for polymer electrolyte fuel cell electrodes,"Journal of Materials Chemistry, vol. 18, pp. 1555-1560, 2008.
(Continued)

*Primary Examiner* — Kishor Mayekar
(74) *Attorney, Agent, or Firm* — Oliff PLC

(57) ABSTRACT

The present disclosure provides a method for producing carbon nanoparticles at low cost and with good efficiency. According to the disclosure of the present description, a voltage is applied between a graphite positive electrode and a negative electrode in an aqueous medium to generate arc discharge in a gap. An inert gas is introduced into the gap from a cylinder bottle at a predetermined flow rate. In this manner, carbon nanoparticles can be produced from carbon steam that is generated in the gap as a result of the arc discharge.

11 Claims, 8 Drawing Sheets

(51) Int. Cl.
*B82Y 40/00* (2011.01)
*B01J 20/28* (2006.01)
*B01J 20/30* (2006.01)
*B01J 20/32* (2006.01)
*B01J 20/20* (2006.01)

(52) U.S. Cl.
CPC ........ *B01J20/28045* (2013.01); *B01J 20/3078* (2013.01); *B01J 20/3208* (2013.01); *B01J 20/3234* (2013.01); *B01J 20/3293* (2013.01); *B01J 20/3295* (2013.01); *B82Y 30/00* (2013.01); *B82Y 40/00* (2013.01); *C01B 31/0206* (2013.01); *C01P 2002/82* (2013.01); *C01P 2002/88* (2013.01); *C01P 2004/16* (2013.01); *C01P 2004/64* (2013.01)

(56) References Cited

U.S. PATENT DOCUMENTS

| | | | |
|---|---|---|---|
| 2006/0008404 | A1 | 1/2006 | Hwang |
| 2006/0165992 | A1 | 7/2006 | Iijima et al. |
| 2009/0269279 | A1* | 10/2009 | Chen ................ A61K 47/48584 424/9.1 |

FOREIGN PATENT DOCUMENTS

| | | | |
|---|---|---|---|
| JP | 2002-348108 A | | 12/2002 |
| JP | 2003-300713 A | | 10/2003 |
| JP | 2005-007281 A | | 1/2005 |
| JP | 2005-170739 | * | 6/2005 |
| JP | 2005-170739 A | | 6/2005 |
| JP | 2006-044970 A | | 2/2006 |
| JP | 2006-114877 A | | 4/2006 |
| JP | 2007-169159 A | | 7/2007 |
| JP | 2008-037661 A | | 2/2008 |
| JP | 2009-190928 A | | 8/2009 |
| JP | 2010-106128 A | | 5/2010 |
| JP | 2011-011952 A | | 1/2011 |
| JP | 2011-044449 A | | 3/2011 |
| JP | 2011-054839 A | | 3/2011 |
| WO | 03/022739 A2 | | 3/2003 |
| WO | 2006/073099 A1 | | 7/2006 |
| WO | 2009/102077 A1 | | 8/2009 |
| WO | 2009/156596 A1 | | 12/2009 |

OTHER PUBLICATIONS

Sano, "Low-cost synthesis of single-walled carbon nanohorns using the arc in water method with gas injection," Journal of Physics D: Applied Physics, vol. 37, pages L17-L20, Mar. 31, 2004.

Sano, "Separated syntheses of Gd-hybridized single-wall carbon nanohorns, single-wall nanotubes and multi-wall nanostructures by arc discharge in water with support of gas injection," Letters to the Editor/Carbon, vol. 43, pp. 447-453, Nov. 5, 2014.

Jul. 17, 2012 Partial Translation of Written Opinion issued in International Applciation No. PCT/JP2012/060171.

* cited by examiner (a)

(b)

(a)

(b)

Values of change in weight

| Sample | Temprature(°C) | Values of change in weight(wt%) |
|---|---|---|
| Carbon nanohorn | 212 | -2 |
|  | 543 | -60 |
|  | 773 | -100 |
|  | 1400 | -99 |

Values of endothermic and exothermic peak temperatures

| Sample | Peak temprature(°C) |
|---|---|
| Carbon nanohorn | △503、△649 |

△：Exotherm　▽：Endotherm

TGA Chart of Carbon nanohorn sample

APPARATUS FOR PRODUCING CARBON NANOMATERIAL, AND USE THEREOF

TECHNICAL FIELD

The present application relates to an apparatus for producing a carbon nanomaterial by arc discharge and use thereof.

BACKGROUND ART

Carbon substances having nanometer-scale microstructures, such as single-walled or multi-walled carbon nanotubes, carbon nanohorns, fullerenes, and nanocapsules, have recently attracted much attention. Such carbon substances are expected to find applications as nanostructured graphite substances for new electronic materials, catalysts, and optical materials. In particular, carbon nanohorns have attracted attention as substances that are the closest to practical use in electrode materials or gas-adsorbing materials of fuel cells.

An arc discharge method, a chemical vapor deposition (CVD) method, and a laser ablation method have been used for producing such carbon nanomaterials. In particular, a variety of methods for producing carbon nanoparticles by arc discharge has been disclosed because nanotubes produced by the arc discharge method have few defects of atomic arrangement (for example, Patent Documents 1 to 5). With those methods, carbon nanomaterials are formed from carbon by vaporizing carbon in vacuum, air, or liquid nitrogen. A method for generating carbon nanohorns by generating carbon vapor by arc discharge in water and rapidly cooling the carbon vapor has also been suggested (for example, Non-patent Document 1).

CITATION LIST

Patent Literatures

Patent Document 1: Japanese Patent Application Publication No. 2001-064004
Patent Document 2: Japanese Patent Application Publication No. 2008-37661
Patent Document 3: Japanese Patent Application Publication No. 2005-170739
Patent Document 4: Japanese Patent Application Publication No. 2002-348108
Patent Document 5: Japanese Patent Publication No. 3044280

Non-Patent Literature

Non-Patent Document 1: Sano Noriaki et al., Journal of material chemistry, 2008, vol. 18, P. 1555-1560

SUMMARY OF INVENTION

The problem associated with the abovementioned methods is that the yield of the carbon nanomaterial related to the consumed amount of carbon starting material is very small. Further, where a carbon nanomaterial is produced in vacuum or liquid nitrogen, the investment in equipment for maintaining vacuum or low temperature is high and the cost of maintenance and control is also high. In addition, complex operations are required to purify and recover the produced carbon nanomaterials. For these reasons, efficient mass production of carbon nanomaterial in a continuous mode cannot be realized, and a high production cost inhibits the industrial use and practical applications. In addition, composites of carbon nanomaterials with metals are difficult to produce efficiently.

The present application has been created to resolve the above-described problems, and it is an objective thereof to provide a method for producing a single-walled or multi-walled carbon nanomaterial at low cost and with good efficiency.

In view of the abovementioned problems, the inventors have investigated what causes the low yield of carbon nanomaterials in the arc discharge method. The results obtained suggest that simultaneously with the formation of single-walled and multi-walled carbon nanomaterials by rapid cooling of carbon vapor produced by arc discharge, some carbon nanomaterials including the produced single-walled carbon nanohorns are again converted into carbon vapor by the arc discharge and lost. Accordingly, the inventors have discovered that carbon nanomaterials can be efficiently produced while preventing the re-evaporation of the carbon nanomaterials by controlling an electrode arrangement such that enables rapid supply of the produced carbon nanomaterials from an arc discharge field to an aqueous medium and a mode of supplying an inert gas to the electrodes. This finding led to the creation of the present invention.

An apparatus for producing a carbon nanomaterial that is disclosed in the present description includes:

a negative electrode at least partially immersed in an aqueous medium;

a positive electrode disposed in the aqueous medium opposite a part of the negative electrode immersed in the aqueous medium at a distance from the negative electrode;

a mechanism that introduces an inert gas between the negative electrode and the positive electrode and forms an inert gas cavity;

a mechanism that applies a voltage to enable formation of an arc discharge generation region between the negative electrode and the positive electrode; and a mechanism that recovers the carbon nanomaterial synthesized from a carbon material preliminary arranged in the arc discharge generation region.

The carbon nanomaterial disclosed in the present description can take a form of a foam-like body including the carbon nanomaterial, aqueous medium, and gas.

A method for producing a carbon nanomaterial disclosed in the present description includes:

synthesizing the carbon nanomaterial by generating an arc discharge in an inert gas cavity formed in an aqueous medium by introducing an inert gas between a negative electrode and a positive electrode in the aqueous medium, and generating carbon vapor from a carbon material preliminary arranged in the inert gas cavity; and recovering the carbon nanomaterial.

The recovery may be a step of recovering the carbon nanomaterial of a foam-like body on the aqueous medium, or the recovery may be a step of recovering the carbon nanomaterial contained in the aqueous medium, or a step of recovering the carbon nanomaterial in a gas phase on the aqueous medium.

According to the disclosure of the present description, it is also possible to provide a reinforcing material, a friction material, a conductivity regulating material, an electromagnetic wave absorbing material, a radioactive substance absorbing material, and a gas storage material including the carbon nanomaterial obtained by the production method in accordance with the present invention. Further, it is also possible to provide a radioactivity adsorbing apparatus equipped with a radioactive substance adsorbing unit including such a carbon nanomaterial, or a radioactivity absorbing apparatus equipped with a radioactivity absorbing unit including such a carbon nanomaterial.

DESCRIPTION OF EMBODIMENTS

Figure 1:
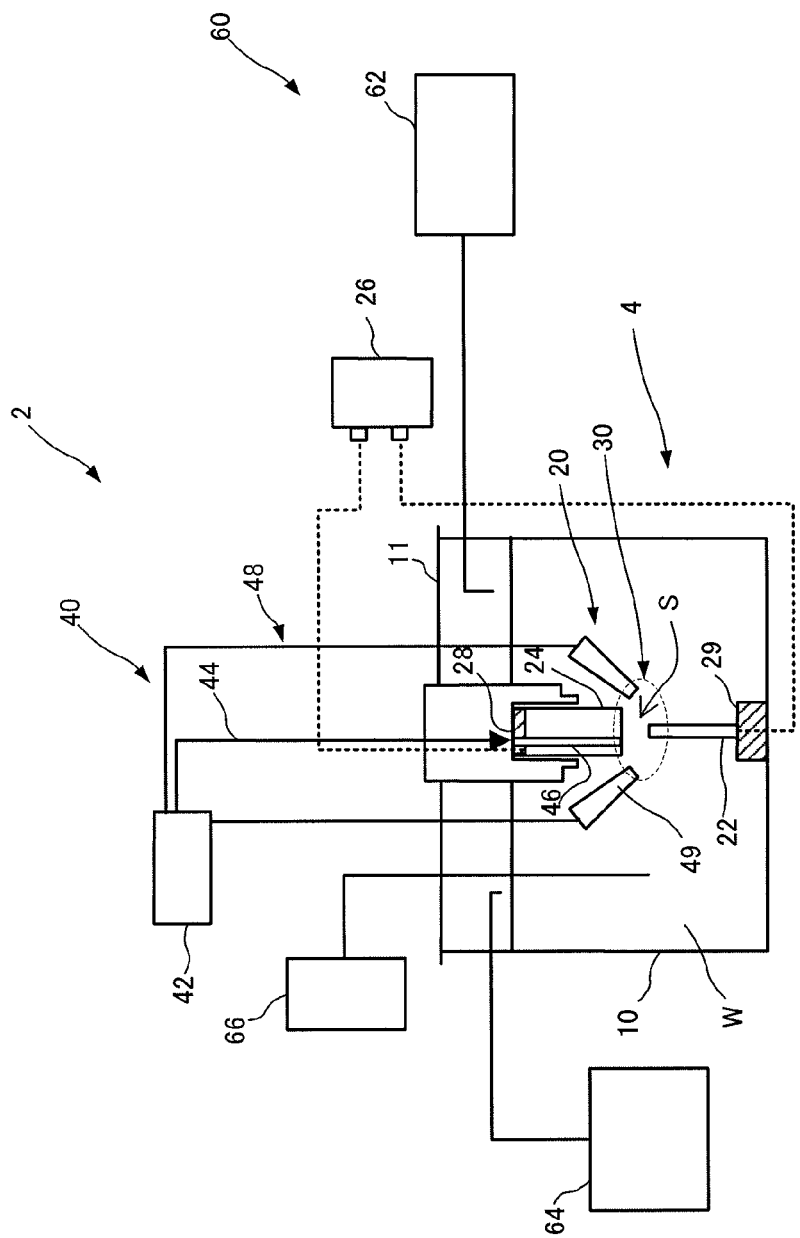
FIG. 1 shows schematically essential features of an example of an apparatus for producing a carbon nanomaterial disclosed in the present description.

According to the disclosure of the present description, it is possible to form an arc discharge field close to an aqueous medium, prevent a carbon nanomaterial generated from carbon vapor from re-evaporating, and produce efficiently a large amount of the carbon nanomaterial.

Further, according to the disclosure of the present description, since a large-scale apparatus is not required, installation and maintenance cost is low and the carbon nanoparticles can be manufactured at a low cost. Further, since the process from generation of arc discharge to formation of carbon nanoparticles can be performed in an aqueous medium tank, the carbon nanomaterial can be produced without performing complex operations.

The "carbon nanomaterial", as referred to in the present description, is inclusive of all of the carbon materials including carbon nanotubes, carbon nanohorns, fullerenes, nanographene, graphene nanoribbons, nanographite, and nanodiamond, and may be in the form of a monolayer or multilayer. Further, "nano", as referred to herein, is generally a size on a nanometer scale, but actually carbon materials that have expanded to a size of a micrometer scale can be also referred to as carbon nanoparticles. The method and apparatus for producing a carbon nanomaterial that are disclosed in the present description are particularly advantageous for producing multi-walled and single-walled carbon nanohorns.

The "discharge", as referred to in the present description, is the process in which insulation breakdown occurs in a gas present between electrodes due to a difference in electric potential applied between the electrodes, electrons are emitted, and an electric current flows. The electric current released in this case can be called discharge current. In the discharge, for example, a spark discharge, a corona discharge, or dissociation and ionization of gas molecules occur, plasma is initiated, and the electric current runs thereon. Therefore, the discharge can be also called plasma arc discharge. In a space taken by the plasma in this process, the gas is in a state of excitation and has a high temperature, and a flash is produced. The arc discharge is preferred because it can be generated even at a normal temperature, provided that a high current flows, and also does not necessarily require a vacuum state.

"Positive electrode" and "negative electrode", as referred to in the present description, are electrodes capable of having electric conductivity. For example, materials including a metal, a ceramic, or carbon can be used for the electrodes. The electrodes may be also formed from one material or a plurality of materials selected from metals, ceramics, and carbon. An additive may be scattered over, applied to, or plated or coated on the entire surface of the electrode or part thereof. Such electrode materials can be acquired by a person skilled in the art by referring, as appropriate, to the conventional techniques. In order to prevent the negative electrode from consumption by the arc discharge, it is preferred that at least the negative electrode, from among the electrodes, be formed from a metal or ceramic material.

"Graphite", as referred to in the present description, is a material including carbon. In the present description, a positive electrode including carbon is referred to as graphite electrode. The graphite electrode can be an electrode for generating an arc discharge and also a starting material for carbon nanoparticles which are to be produced. In this case, it is preferred that the consumable graphite electrode be designed to be repeatedly replaceable. Further, when no graphite is used for the positive electrode, graphite as a starting material for the carbon nanomaterial is prepared separately from the electrode. When no graphite is used for the electrodes, electrode consumption can be prevented and the carbon nanomaterial can be produced at a low cost. Graphite may be in any form, and the suitable shape such as plate-like shape, can be selected as appropriate. Whether to use a graphite positive electrode or prepare graphite separately from the electrode can be determined, as appropriate, according to the design of the apparatus. In the present embodiment, the case is explained in which the graphite positive electrode is used.

The graphite may include only carbon, or may also include or incorporate an additive. Alternatively, the additive may be scattered over, applied to, or plated or coated on the entire graphite surface or part thereof. For example, when a metal such as iron or nickel is used as the additive, the metal nanoparticles can be encapsulated in the carbon nanohorns, that is, the metal nanoparticles can be introduced close to the center of carbon nanohorn particles which are nanoparticles in which closed short single-walled carbon nanotubes are aggregated into a spherical shape. A metal such as Pt may be used for coating. Pt excels in electric conductivity and catalytic activity, and by using such a positive electrode, it is possible to obtained a carbon nanomaterial forming a composite with a noble metal. Such carbon-including materials can be acquired by a person skilled in the art by referring, as appropriate, to the conventional techniques.

The "aqueous medium", as referred to in the present description, is a substance having stirring fluidity which is a liquid medium including water. In particular, an aqueous liquid demonstrating stirring fluidity at a temperature equal to or lower than the arc discharge generation temperature is preferred. For example, water or water-containing liquid mixtures, silicone oil, oils, aqueous solutions, liquid helium, and liquid nitrogen can be used. Among them, water is preferred because it is inexpensive, easy to procure, and easy to handle. Under the arc discharge conditions, the aqueous medium can have a smaller cluster structure and the redox potential thereof can be increased by comparison with those of water in the usual state. The miniaturization of the cluster structure and increase in redox potential of the aqueous medium can enhance the formation of carbon nanoparticles.

The "inert gas", as referred to in the present description, is a gas with poor chemical reactivity. Examples of the inert gases include elements of the 18th group (rare gases) constituted by helium, neon, argon, krypton, xenon, and radon, hydrazine, nitrogen gas, carbon dioxide, hydrogen gas, or mixtures thereof. Among them nitrogen gas is preferred because it is inexpensive and easy to procure. The inert gas can be stored as gas, or may be acquired as a liquid, or may be acquired as a solid, provided that it can be introduced as gas into the arc discharge generation region. The inactive substance of such a kind can be acquired, as appropriate, by a person skilled in the art by referring to the conventional techniques.

Figure 2:
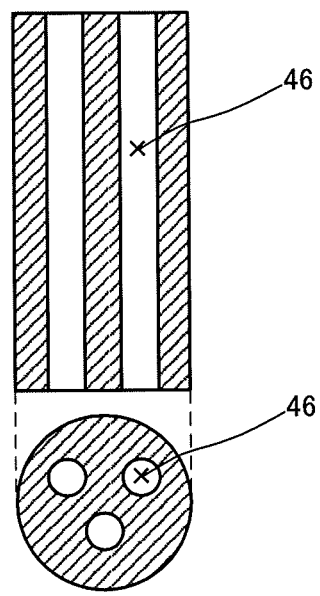
FIG. 2 shows an example of a negative electrode disclosed in the present description.
Figure 2:
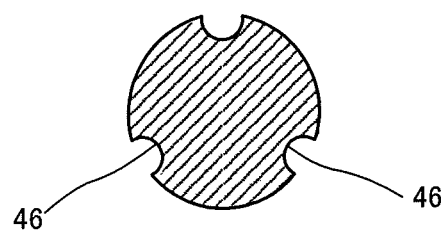

An embodiment of the present invention will be explained hereinbelow with reference to the drawings. FIG. 1 shows schematically an example of the apparatus that is advantageous for the method for producing a carbon nanohorn in accordance with the present invention. FIG. 2 shows an example in which a supply path for introducing the inert gas is formed in the negative electrode.

[Apparatus for Producing Carbon Nanomaterial]

An apparatus 2 for producing carbon nanoparticles disclosed in the present description is provided with a producing unit 4 that produces the carbon nanomaterial by generating an arc discharge and a recovery unit 60 that recovers the produced carbon nanomaterial.

(Carbon Nanomaterial Production Unit)

As shown in FIG. 1, in a carbon nanomaterial production unit 4, a voltage is applied to a region into which the inert gas has been introduced between the negative electrode 24 and carbon positive electrode 22, and an arc discharge generation region 30 is formed in a state of being brought close to the aqueous medium W. The production unit 4 is provided with an aqueous medium tank 10 and an arc discharge generation section 20 located inside thereof.

(Aqueous Medium Tank)

As shown in FIG. 1, the aqueous medium tank 10 is configured as a tank that can enclose the arc discharge generation section 20 and can contain a predetermined amount of the aqueous medium W functioning as a cooling medium for carbon vapor.

It is preferred that the aqueous medium tank 10 could be sealed. For example, a lid 11 may be provided to seal the aqueous medium tank 10. As a result of the aqueous medium tank being made sealable, the pressure inside the aqueous medium tank rises when the inert gas is introduced, and the production of the carbon nanoparticles is enhanced under the high-pressure conditions. In addition, the aqueous medium tank 10 may be also provided with a temperature control unit capable of controlling the temperature of the aqueous medium contained in the tank.

(Arc Discharge Generation Section)

The arc discharge generation section 20 is provided with the energizable graphite positive electrode 22 and the negative electrode 24 disposed such that the inert gas can be introduced therebetween. By connecting the graphite positive electrode 22 to a (+) pole of a power source 26 and connecting the negative electrode 24 to a (−) pole of the power source 26, it is possible to apply a voltage between the graphite positive electrode 22 and the negative electrode 24. The difference in potential applied between the electrodes in this case can create an insulation breakdown in the gas present between the electrodes and generate an arc discharge between the electrodes. By using the graphite positive electrode 22 it is possible to integrate the electrode with a carbon material. Therefore, the apparatus configuration can be easily designed.

It is preferred that the cross-sectional surface area of the negative electrode 24 be larger than that of the graphite positive electrode 22. In such a case, the produced carbon nanomaterial can be prevented from evaporating again. It is more preferred that the cross-sectional surface area of the negative electrode 24 be 1.5 times or more the cross-sectional surface area of the graphite positive electrode 22. Further, it is preferred that the gap between the graphite positive electrode 22 and the negative electrode 24 be from 1 mm to 2 mm. By setting the gap S within such a range, it is possible to generate the arc discharge efficiently. This is because where the gap is less than 1 mm or greater than 2 mm, the arc discharge becomes unstable. In order to maintain the gap S between the graphite positive electrode 22 and the negative electrode 24 within a range from 1 mm to 2 mm, it is preferred that a support section supporting the negative electrode 24 or a support section supporting the graphite positive electrode 22 be disposed drivably. It is even more preferred that the gap S between the graphite positive electrode 22 and the negative electrode 24 be adjustable. This is because the graphite positive electrode 22 is consumed by the arc discharge with the passage of time and the gap S between the graphite positive electrode and the negative electrode 24 opens, thereby making the arc discharge unstable.

An additive may be contained in or held on the surface of the graphite positive electrode 22. Thus, the additive may be scattered over, applied to, or plated or coated on the entire graphite surface or part thereof. For example, when a metal such as Pt, iron, and nickel is used as the additive, the metal nanoparticles can be encapsulated in the carbon nanohorns particles, that is, the metal nanoparticles can be introduced close to the center of carbon nanohorns particles which are nanoparticles in which closed short single-walled carbon nanotubes are aggregated into a spherical shape. Such carbon-including materials can be acquired by a person skilled in the art by referring, as appropriate, to the conventional techniques.

The shape and arrangement of the negative electrode 24 and the graphite positive electrode 22 are not limited. For example, the electrodes can be disposed opposite each other in the vertical direction in relation to the force of gravity. Disposing the electrodes opposite each other in the vertical direction is advantageous not only because the aqueous medium W can be easily stirred by the below-described rotation of the negative electrode 24, but also because the arc discharge is stabilized.

As shown in FIG. 1, rotation devices 28, 29 may be disposed correspondingly to the negative electrode 24 and the graphite positive electrode 22 to enable the rotation thereof. The rotation device 28 can rotate the negative electrode 24 continuously or intermittently, and the rotation device 29 can rotate the graphite positive electrode 22 continuously or intermittently. The rotation can be also performed in a state in which the angles of the negative electrode 24 and the graphite positive electrode 22 have been adjusted. For example, the arrangement may be such as to enable the rotation of the electrodes in a state in which the electrodes are inclined in the long axis direction thereof, for example, at an angle of about, for example, 0.5 degree or 1 degree with respect to the vertical direction. As a result, the electrodes can be rotated while being subjected to vibrations, thereby making it possible to effectively prevent the carbon nanoparticles from deposition or remove the deposited carbon nanoparticles. Further, when the electrodes are rotated in the inclined state thereof, it is preferred that the rotational movement be executed for removing the deposits after the arc discharge, rather than during the arc discharge, in order not to impede the air discharge stability.

Figure 3:
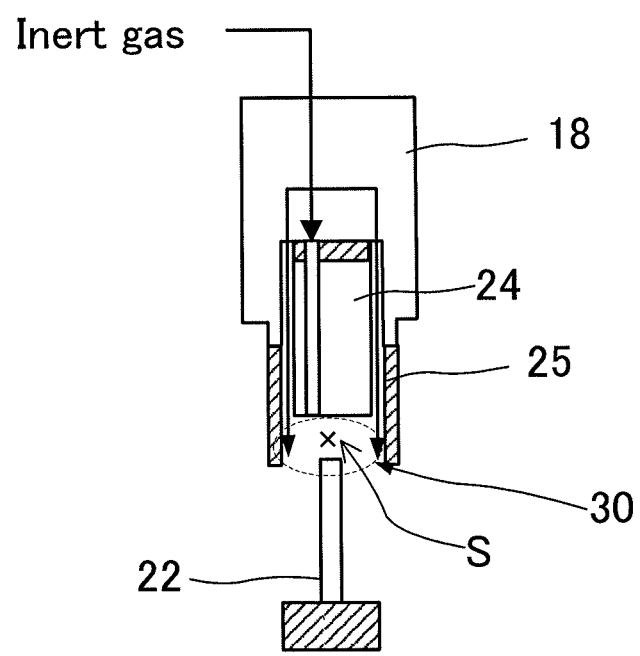
FIG. 3 shows an example of an outer wall of the apparatus for producing a carbon nanomaterial disclosed in the present description.
Figure 4:
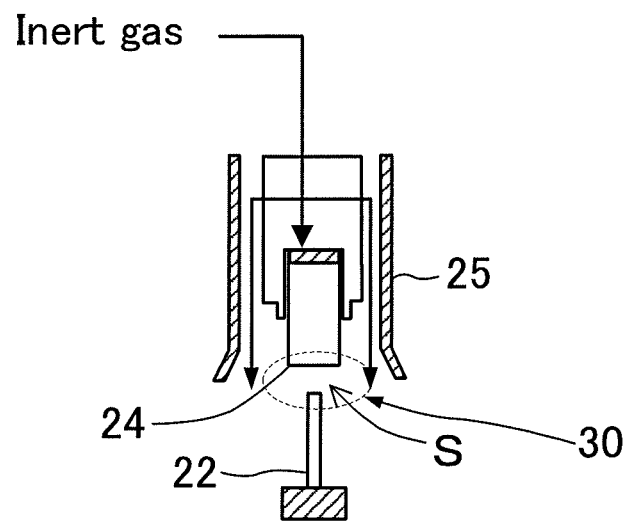
FIG. 4 shows another example of an outer wall of the apparatus for producing a carbon nanomaterial disclosed in the present description.
Figure 4:
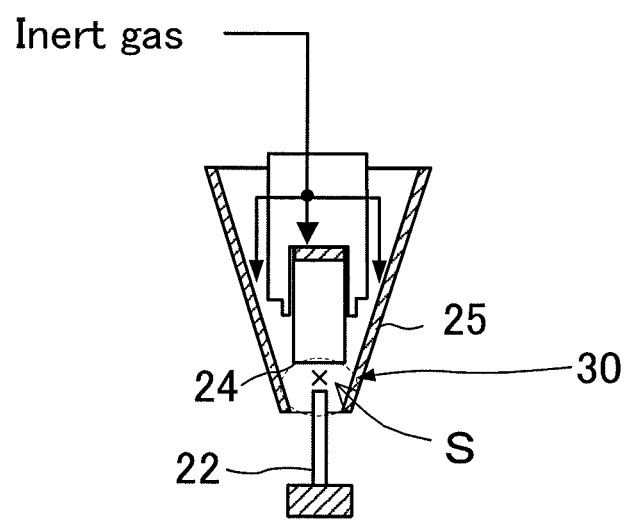

As shown in FIG. 3, an outer wall 25 that substantially cuts off the aqueous medium W can be provided so as to surround the gap S. In the present embodiment, the outer wall 25 has a substantially cylindrical shape enclosing the outer circumference of the negative electrode 24. The outer wall may also reach the gap S. As a result, the directivity of the discharge towards the gap S between the negative electrode and the graphite positive electrode 22 can be increased, the arc discharge generation region 30 can be reliably formed in the gap S, and the arc discharge can be generated more effectively. Further, by providing the outer wall 25, it is possible to ensure compactness of the arc discharge generation region 30 in the aqueous medium W. Therefore, the carbon vapor generated in the arc discharge generation region 30 rapidly comes into contact with the aqueous medium W. Further, the outer wall 25 can be also configured as shown in FIG. 4. In the configuration shown in FIG. 4(b), the directivity of the inert gas to the gap S can be increased by the outer wall 25.

Further, as shown in FIG. 3, the outer wall 25 may be connected to a drive unit 18 for enabling the positional adjustment of the outer wall 25. By enabling the positional adjustment of the outer wall 25, it is possible to change the directivity of the inert gas with respect to the gap S and better control the energy profile of the arc discharge generation region 30. Thus, the amount of produced carbon nanomaterial can be controlled. The outer wall 25 can be made using a well-known material, for example, metals, ceramics, tungsten, or graphite, but using graphite, iron, and aluminum, which are electrically conductive, is preferred. The best option is to use graphite, which has high electronegativity, for the outer wall 25. Where graphite is used for the outer wall 25, the amount of electrons emitted into the compartment when a voltage is applied between the electrodes is increased and the temperature of the gap S rises efficiently. Where depressions and protrusions are provided on the inner surface of the outer wall 25, the surface area is increased, thereby advantageously increasing the amount of electrons emitted into the compartment and stabilizing the generated arc discharge.

(Gas Distribution Unit)

As shown in FIG. 1, a gas distribution unit 40 can introduce the inert gas into the gap S and can form in situ an inert gas cavity serving as the arc discharge generation region 30 in the aqueous medium when a voltage is applied between the electrodes. The gas distribution unit 40 can also supply an inert gas serving as a carrier that brings the carbon vapor or carbon nanomaterial produced in the arc discharge generation region 30 into contact with the aqueous medium W for cooling and moves the carbon vapor or carbon nanomaterial towards the aqueous medium side.

The gas distribution unit 40 can be provided with a supply system 44 that supplies the inert gas from an inert gas cylinder 42 approximately along the axial direction of the negative electrode 24 towards the gap S between the negative electrode 24 and the carbon positive electrode 22.

As shown in FIG. 1 and FIG. 2(a), the supply system 44 can be provided with one, or two or more supply paths 46 passing through inside the negative electrode 24 in order to supply the inert gas efficiently to the vicinity of the negative electrode 24. For example, the supply path 46 may be in the form of one, or two or more vent grooves formed at the outer circumferential side of the negative electrode 24, as shown in FIG. 2(b). Further, each of the introduction paths 46 shown in these figures may not be formed vertically. The introducing path 46 may be formed in a spiral shape passing along the outer circumference of the negative electrode 24 or thereinside. It is preferred that the negative electrode 24 be arranged vertically in relation to the gravity force direction and be provided with a spiral introducing path 46, since the inert gas can be stably introduced as a swirling flow into the arc discharge generation region 30, and plasma can be confined to the swirl center by the pinch effect created by the arc discharge.

The supply system 44 may be provided with one, two, or three or more supply paths 46. When the supply paths 46 are formed, the shape of the negative electrode 24 and the shape and number of the introducing paths 46 are not limited and can be changed, as appropriate, within a design range.

As shown in FIG. 1, a supply system 48 that introduces the inert gas from one side into the gap S can be provided to form the inert gas cavity in the aqueous medium W in the gap S. The supply system 48 for sidewise supply can supply to the gap S the inert gas within a range of directions, including oblique downward-sidewise (perfectly transverse)-oblique upward directions or from a plurality of locations. By providing such a supply system 48, it is possible to form the inert gas cavity with good stability in the vicinity thereof including the gap S in the aqueous medium W. Further, by providing the supply system 48, it is possible to control the formation position thereof in a manner such that the inert gas is introduced in an optimum state into the gap S that changes with time due to the consumption of the carbon positive electrode 22 by the arc discharge. Alternatively, the inert gas can be introduced into the gap S stably, regardless of the changes in the gap S. When the outer wall 25 is provided, the supply system 48 is provided such that the gas flow is not hindered by the outer wall 25. For example, the configuration is such that when a distal end section reaches the periphery of the gap S, the supply system 48 can supply the inert gas from an adequate location towards the gap S within a range of the oblique downward direction-sidewise direction of the gap S.

When the inert gas is thus introduced from a side, the inert gas may be introduced from one location into the gap S, but it is preferred that the inert gas be introduced from a plurality of locations. It is even more preferred that the inert gas be introduced uniformly from the periphery of the gap S. For example, a plurality of supply systems 48 can be provided with a fixed spacing so as to surround the space S, or a plurality of supply systems 48 can be provided symmetrically with respect to the gap S, or one, or two or more supply systems 48 can be provided in a ring-shaped arrangement so as to surround the gap S.

Figure 5:
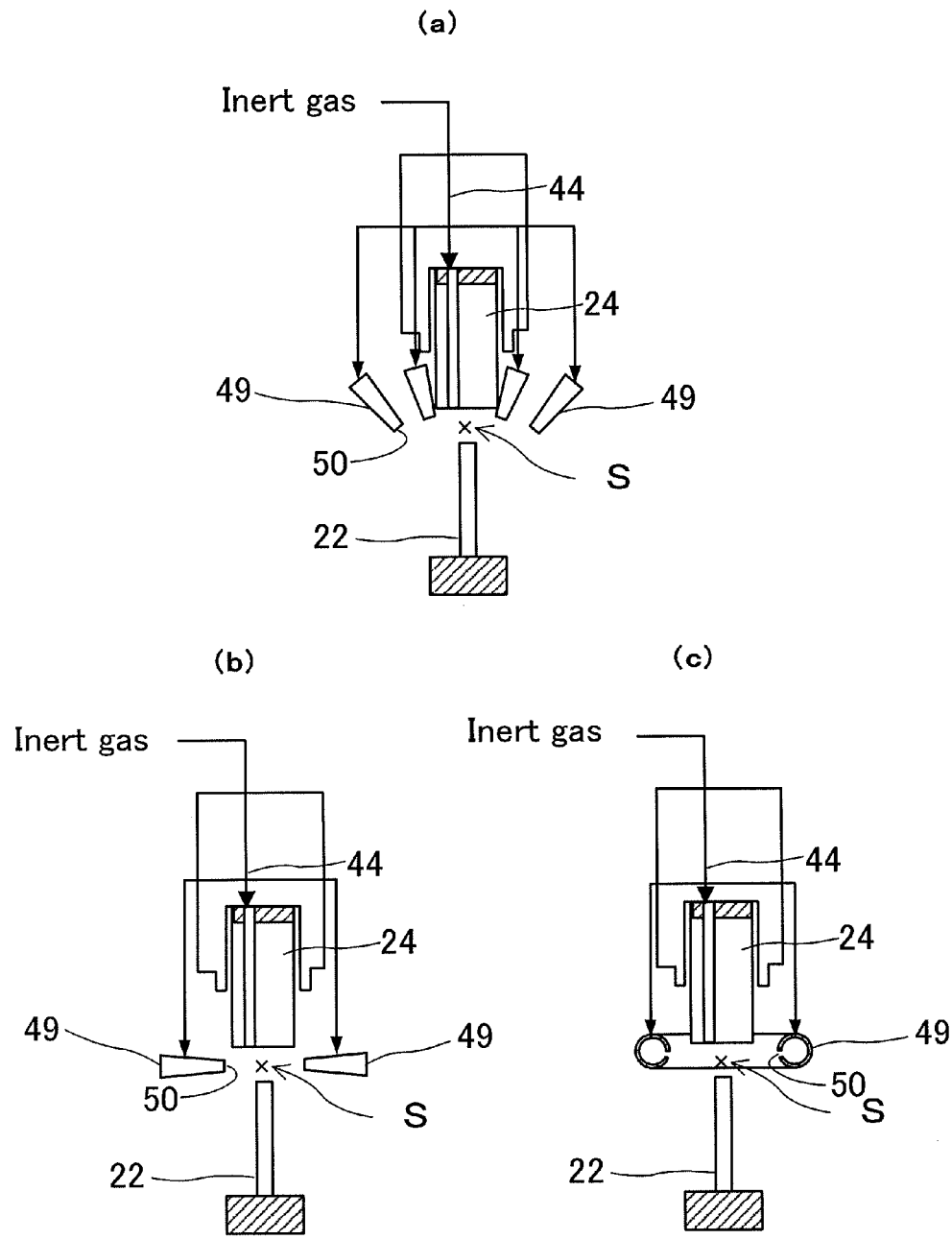
FIG. 5 shows another example of a supply system of the apparatus for producing a carbon nanomaterial disclosed in the present description.

More specifically, for example, as shown in FIG. 5(a), a plurality of supply paths 49 can be provided on the side of the negative electrode 24, so that the inert gas is introduced from obliquely above the gap S towards the gap S. Further, a plurality of supply paths 49 can be also provided such, as shown in FIG. 5(b), that the inert gas is introduced from the side of the gap S towards the gap S. Furthermore, as shown in FIG. 5(c), the ring-shaped supply path 49 may be provided such that a plurality of gas supply ports 50 face the gap S.

The gas distribution unit 40 may have only the supply system 44, or only the supply system 48, or both systems as the gas supply system. It is preferred that the supply system 44 and the supply system 48 be provided. In such a case, the state of the formation region of the inert gas cavity can be controlled more efficiently, and the flow rate is also easy to control.

By forming in situ the inert gas cavity in the region including the gap S in the aqueous medium W with the gas distribution unit 40, it is possible to generate efficiently the carbon vapor and/or carbon nanomaterial from the carbon material by the arc discharge and move the generated vapor and/or material to the aqueous medium W side.

(Carbon Nanomaterial Recovery Unit)

The recovery unit 60 can recover the carbon nanomaterial from the liquid phase of the aqueous medium W, gaseous phase above the aqueous medium W, and liquid surface of the aqueous medium W. The apparatus 2 shown in FIG. 1 is provided with three recovery devices 62, 64, and 66. The first recovery device 62 recovers the gaseous phase located above the aqueous medium W and recovers the carbon nanomaterial contained in the gaseous phase. The gaseous phase can be recovered by sucking in the gas located above the aqueous medium with a pump or the like and recovering a solid component contained in the gas. A dry classifier such as a dust collector, an air separator, and a cyclone can be used as the recovery device 62. Since carbon nanomaterials are typically electrically conductive, an electrostatic collection method is useful, but recovery with a filter or the like is effective in the present production apparatus 2.

The second recovery device 64 recovers the carbon nanomaterial flowing in the form of foam on the aqueous medium W. The carbon nanomaterial in the form of a foam-like body represents a state in which aggregates of carbon nanomaterial particles with a diameter of about 20 nm to about 100 nm encapsulate gas together with the aqueous medium. With the present production apparatus 2, such foam-like bodies float on the aqueous medium W. Therefore, they can be recovered with an appropriate device. The recovery method is not particularly limited. Examples of suitable devices include a foam recovery device that is moved horizontally along the liquid surface so as to scoop up the foamed-like bodies or the foamed-like bodies and water located in the vicinity of the water surface, and a foam recovery device that rotates about a rotation axis parallel to the liquid surface. The foam recovery device 64 can be equipped with a foam trapping members of various types, such as a suction tube, a vane, a claw-shaped member, or a scraper, according to the type of movement performed relative to the liquid surface. For example, the foam recovery device may cause the foam-like bodies to adhere to the surface of a roller that is positioned at one end of the liquid surface and rotates about a rotation axis parallel to the liquid surface.

The foam-like bodies recovered by the foam recovery device 64 can be temporarily stored in an appropriate storage tank. Then, the foam-like bodies can be separated from the aqueous medium and subjected thereafter to solid-liquid separation, thereby recovering the solid carbon nanomaterial. A device that directly dries the foamed-like bodies may be provided in addition to the device for recovering the foam-like bodies. By drying the foam-like bodies, it is possible to obtain a powdered carbon nanomaterial.

The third recovery device 66 recovers the liquid-phase carbon nanomaterial contained in the aqueous medium W. The third recovery device 66 recovers, as appropriate, the aqueous medium W contained in the aqueous medium tank 10 and then recovers the carbon nanomaterial contained in the medium W by solid-liquid separation or the like. A method for recovering the medium W is not particularly limited. The aqueous medium W contained in the aqueous medium tank 10 may be caused to overflow from the tank, or the aqueous medium W may be sucked in with a suction unit introduced into the tank 10. The aqueous medium W may be also recovered from the bottom of the aqueous medium tank 10. The carbon nanomaterial can be recovered by subjecting the aqueous medium W recovered in the above-described manner to solid-liquid separation. A well-known separation method such as centrifugal separation, filtration, and adsorption can be used, as appropriate, for the solid-liquid separation. In the third recovery device 66, in particular, when the aqueous medium W is recovered by overflowing, the foam-like bodies of the carbon nanomaterial are also recovered at the same time.

The carbon nanomaterials recovered by the recovery devices 62, 64, and 66 of the above-described types can be provided in the form corresponding to the recovery device, and also can be fractionated, for example, by electrophoresis on the basis of electric conductivity thereof. Thus, the present production apparatus 2 can be separately equipped with an electrophoresis fractionation device. As described hereinabove, the carbon nanomaterials produced in the present production apparatus 2 are different in electric conductivity characteristic from the conventional carbon nanotubes.

With the present production apparatus 2, the distance between the electrodes, that is, the gap S, can be optimized by using the abovementioned configuration. At the same time, the inert gas cavity optimized for the arc discharge can be formed by controlling the supply form of the inert gas to the gap S. As a result, the location and scale of the arc discharge generation region 30 and the energy profile of the arc discharge generation region 30, for example, the amount of electrons to be discharged or pressure, can be controlled. Thus, the heat generation region created by the arc discharge and the temperature of the generated heat can be controlled. Therefore, the carbon vapor can be generated effectively.

In the explanation of the above-described embodiment of the present production apparatus, the arc discharge generation unit, with the exception of the gas distribution unit, corresponds to the negative electrode, positive electrode, and voltage application mechanism of the present invention, and the gas distribution unit corresponds to the inert gas cavity formation mechanism.

(Method for Producing Carbon Nanomaterial)

In accordance with the present invention, by using the present production apparatus, it is possible to provide a method for producing a carbon nanomaterial including the below-descried steps. Thus, the method for producing a carbon nanomaterial in accordance with the present invention can include a step of synthesizing the carbon nanomaterial by generating an arc discharge in an inert gas cavity formed in an aqueous medium W by introducing an inert gas between a negative electrode and a positive electrode in the aqueous medium, and generating carbon vapor from a carbon material preliminary arranged in the inert gas cavity; and a step of recovering the carbon nanomaterial. With the present production method, the carbon nanomaterial can be efficiently synthesized by introducing the inert gas between the positive electrode and the negative electrode, forming in situ the inert gas cavity in the aqueous medium by the gas flow, and generating the arc discharge in the inert gas cavity.

The present production method can also include a step of removing the carbon nanomaterial or an impurity that has adhered to the electrodes. The carbon nanomaterial generated when the carbon vapor is cooled adheres to and deposits on the graphite positive electrode 22. Part of the adhered deposited matter is peeled off from a partition wall by a pressure received from the arc discharge or a flow pressure of the inert gas that is fed in, and this part precipitates and settles in the aqueous medium W and is eventually separated from the carbon nanomaterial floating on the aqueous medium surface.

In order to remove the impurity that has adhered to the electrodes as a result of arc discharge, it is possible, for example, to generate the arc discharge in a state in which the cross-sectional surface area of the negative electrode 24 is larger than the cross-sectional area of the graphite positive electrode, whereby a propulsion force is obtained as a Lorentz force in the arc discharge generation region 30 and the impurity strongly attached to the electrodes or partition wall can be peeled off by a jet. Further, the flow pressure of the inert gas introduced into the arc discharge generation region 30 may be also used, or the aqueous medium W may be stirred by causing rotational vibrations of either or both of the graphite positive electrode 22 and the negative electrode 24 in order to remove the impurity or generated carbon nanomaterial that has adhered to the electrodes.

In order to prevent the produced carbon nanomaterial from being evaporated again, a step may be performed in which only the arc discharge is stopped, while the inert gas is being supplied into the gap S, and the produced carbon vapor is carried out together with the inert gas into the aqueous medium W. Further, the negative electrode 24 may be rotationally vibrated, while supplying the inert gas as the arc discharge is stopped. As a result, the carbon nanomaterial carried out into the aqueous medium W can be dispersed, and also the carbon nanomaterial can be prevented from cohesion or adhesion to the aqueous medium tank 10 or the electrodes. Therefore, a large amount of the carbon nanomaterial can be obtained.

(Carbon Nanomaterial)

The production method in accordance with the present invention provides a novel carbon nanomaterial. The carbon nanomaterial obtained from a carbon material through the generation of an arc discharge in the inert gas cavity formed in situ in the aqueous medium has not only the properties common with the carbon nanomaterials represented by the conventional carbon nanotubes, but also different characteristics, although the origin thereof cannot be theoretically explained.

The carbon nanomaterial produced by the present production apparatus 2 has a property of reducing the electric conductivity of carbon nanotubes serving as the conventional conductive material. Thus, the electric conductivity of the produced carbon nanomaterial tends to be lower than that of the conventional carbon nanotubes. For example, where the buckypaper from carbon nanotubes is impregnated with the present carbon nanomaterial, the sheet resistance ($\Omega$/sq) and surface resistance ($\Omega$/cm) are increased over those of the buckypaper constituted only by carbon nanotubes. Further, the electric conductivity (S/cm) thereof is decreased. Where buckypaper is fabricated by mixing the present carbon nanomaterial with carbon nanotubes, the properties tend to change in the same manner as in the buckypaper impregnated with the present carbon nanomaterial in comparison with those of the buckypaper constituted only by carbon nanotubes. Hence, the present carbon nanomaterial may be used as an electric conductivity adjustment material.

Further, where the present carbon nanomaterial is impregnated in a carbon nanotube layer, it demonstrates a property of improving the shape retaining ability and mechanical strength of the carbon nanotube layer. Thus, it is effective as a reinforcing material, in particular a reinforcing material for carbon nanotubes.

The present carbon nanomaterial is also useful as a friction material. As for, the usual graphite or carbon nanotubes are used as lubricating materials. By contrast, the present carbon nanomaterial has a property of increasing the friction coefficient of solid surfaces.

In addition, the present carbon nanomaterial is also suitable for construction materials for aerospace applications, precision machinery parts, building and construction materials, sealing materials, thermally insulating materials, leisure and sports materials, coating materials, nuclear power generating materials, power storage, fuel cell members, primary battery materials, lithium ion secondary battery materials, new energy applications, far-IR and heat radiating materials, sliding materials, wear-resistant materials, friction materials, polishing materials LSI materials of next generation, FPD black matrixes, FED elements, heat radiating and thermally conductive materials, ink and toner materials, members for semiconductor fabrication, members for coating, materials for adsorption and separation, electrodes for electric discharge machining, members for solar cell production, heat exchangers and reactors, nursing supplies and medical equipment (beds, headrests/CFRP, artificial arms, artificial legs, stealth knives, stealth scissors, artificial skin), pharmaceutical and medical materials, bacteria holding materials, health food additives, soil modifiers, water purification materials, VOC removing materials, dioxin removing materials, deodorizing materials, electromagnetic wave absorbing materials, electromagnetic wave adjustment materials, radioactive substance absorbing materials, and radiation absorbing materials.

The present carbon nanomaterial can be used in various component materials. For example, it can be used in composite materials with inorganic materials such as metals, nonferrous metals, rare earth metals, and glass, and composite materials with organic materials such as organic polymers and organic low-molecular compound. Such composite materials are suitable, for example, for bearings (including plastic bearings and oil-impregnated sintered bearings), electrically conductive materials, electromagnetic wave absorbing materials, artificial joints (including artificial joint cups), artificial skin (functional skin), and electrically conductive sheets (Nylon, textiles, yarns, cotton, silk, and polyethylene).

Due to the electrical characteristics thereof, the present carbon nanomaterial is suitable for materials for regulating conduction noise and emission noise of ferrite cores of power supplies and signals, materials for adjusting electric conductivity of nonwoven materials (gaskets), conductive band tape materials, composite materials for vibration damping (measures against grounding), materials for fixing cables with resin conductive clamps, grounding materials, shielding materials for bent sections of electrically conductive spiral cables, shielding, protective, and accommodating materials for shielded-tube cables, sheet materials for metal foil tapes, shielding and grounding materials, materials for resonance control of electromagnetic waves with electromagnetic wave control agents, electromagnetic wave absorbing materials, conductive vibration damping and preventing materials, high-transmittance shielded window materials, conductive silicone rubber (dustproof, water-proof, and shielding) materials, binding, fixing and noise-preventing materials for radio dark rooms (resin conductive clamps), materials for noise control and suppression in LED signal devices, and conductive ink (compounds with resins (including kneaded composition)) materials.

Due to the radiation absorption characteristic thereof, the present carbon nanomaterial can be used as a radiation absorbing base material for composite materials for nuclear reactors and containment containers and for base materials for radiation protection. Due to the radioactive substance adsorption ability, the present carbon nanomaterial can be used as a radioactive substance adsorber. For example, where radioactive substances (including radon, thoron, radium, cesium, iodine, plutonium, and strontium) are released in very small amounts into the natural atmosphere, they react with mircroamounts of gases and water vapor, form clusters with a diameter within a range of 0.001 µm to 100 µm (free daughter nuclides) and become aerosol particles. Such particles are called suspended particulate matter (SPM) in atmospheric environment and environment inside the buildings (homes, offices, hospitals, and the like). The present carbon nanomaterial can effectively adsorb such aerosol particles.

For example, by preparing a radioactive substance adsorbing unit by coating or impregnating a gas-permeable particle-trapping filter such as HEPA filter with the present carbon nanomaterial and supplying a radioactive aerosol from the atmosphere into such an adsorption unit or an adsorption apparatus equipped with such an adsorption unit, it is possible to adsorb and recover the radioactive substances contained in the atmosphere, or such radioactive substances converted into aerosol, with such an adsorption unit.

Further, the present carbon nanomaterial can be also used, as a material attached to a UF film, in a radioactive substance adsorption unit or a radioactive substance adsorption apparatus equipped with the adsorption unit. In such a case, due to the radioactive substance adsorption ability thereof, the carbon nanomaterial can adsorb and capture the radioactive substance contained in liquids including the radioactive substance. The radioactive substance adsorbed on the present carbon nanomaterial is detached from the UF film by reverse washing and carrier out of the system. By recovering the obtained liquid with a high concentration of radioactive substance and storing the liquid in a radioactive storage container, it is possible to ensure safe and effective storage of radioactive materials.

The present carbon nanomaterial has excellent ability of being fixedly attached to a filter base material and forming a film. Therefore, even better radioactive substance adsorption ability and radiation absorption ability can be demonstrated and such performance can be demonstrated with good stability.

Further, the present carbon nanomaterial can be used, individually or as a composite material, for thermoplastic (resin) materials, conductive rubbers, hydrogen gas adsorption and storage, solar dielectric materials, electrically conductive paper, electrically conductive buckypaper, electrically conductive resins, electrically conductive coating material, vaccine culturing materials, mycelium culturing materials, electrically conductive fillers, high-strength fillers for reinforcing resins or metals, heat radiating members, fillers with high thermal conductivity, bio cell culture and cell multiplication materials, electrically conductive channels, FET channels, semiconductor wiring materials, supersensitive sensors, drug carriers, SPM needle materials, nano-tweezers materials, catalyst support electrodes for fuel cells, materials for removal of singlet oxygen, materials for diagnostic medicines, photolithography, organic solar cells, semiconductor trays (anti-static sheets), electrically conductive pastes, ITS, power storage devices, fuel cells, clothing, catheters, carbon fiber materials, and non-woven materials.

When the present carbon nanomaterial is combined with fibrous materials, examples of natural fibers that can be used for combining include vegetable fibers (cotton, hemp) and animal fibers (hair, sheep wool, wool, animal hair, silk). Examples of suitable chemical fibers include recycled fibers (rayon, cupra), semi-synthetic fibers (acetate, triacetate, promix), synthetic fibers (Nylon, aramid, polyester, acryl, vinylon, poly(vinyl chloride), vinylidene, polyethylene, polypropylene, polyurethanes, polychlal), inorganic fibers (carbon fibers, metallic fibers). In addition, feathers (feathers, down) can be also used as materials for composite fibers using the nanomaterial. Spandex can be also used as a fiber material.

Examples of inorganic materials for forming composites include the following glass materials: soda glass, lead crystal glass, borosilicate glass (heat-resistant glass), glass with ultrahigh heat resistance, float glass, reinforced glass, frosted glass, molded sheet glass (molded glass), Saint-Gobain glass, colored antic glass, mirrors, IR absorbing glass, antireflective processed glass (non-glare S), low-reflective glass, high-transmittance glass, heat resistance glass sheets, wire glass, checker glass, mall glass, ceramic printed glass, stained glass-like decorative glass.

The present carbon nanomaterial can be also used for producing composites with metals. The metals, as referred to herein, are noble metals and base metals. The noble metals are gold, silver, platinum, palladium, rhodium, iridium, ruthenium, osmium, base metals, alkali metals, alkaline earth metals, aluminum, zinc, and the like.

Specific examples of metal composite materials include H-shaped steel, steel pipes for machine structures, large-diameter steel pipes, color C steel, white C steel, equal-angle angular steel, white angular steel, scalene angular steel, steel sheets, grooved steel, white grooved steel, white checkered steel sheets, lightweight grooved steel, galvanized steel sheets, white deck and white keystone, expanded steel, white expanded steel, I beams, angular steel, stainless steel sheets, flat steel, white flat steel, stainless steel, angular steel, wide flat steel, stainless angular pipes, round rods, stainless decorated pipes, shaped round rods, stainless distribution pipes, angular pipes and color angular pipes, white angular pipes, small angular pipes, white angular pipes, super-small angular pipes, gas pipes, white gas pipes, scaffolding pipes, structural steel pipes (STK), patterned steel sheets, shaped round bars, expanded metal, angular bars, lightweight grooved steel, flat bars, lightweight C-type steel, structural steel pipes, channel steel, gas pipes, H-shaped steel, medium-diameter angular steel pipe, I beams, large-diameter angular steel pipes, equal-angle steel, angular pipe steel, scalene steel, and super-small angular pipes.

Due to the presence of the present carbon nanomaterial, the above-mentioned composite materials and products including such composite materials can demonstrate high strength, high toughness, impact resistance, low friction coefficient, wear resistance, high hardness, electric conductivity, antistatic properties, electromagnetic wave absorption ability, resistance to radiation, radioactive substance adsorption ability, and gas (inclusive of aerosol) adsorption and storage ability.

Further, with the production method in accordance with the present invention, a carbon nanomaterial, which is a foam-like body, can be also provided. The foam-like body of the carbon nanomaterial in accordance with the present invention includes the present carbon nanomaterial, gas, and aqueous medium. The gas may include the inert gas that is used in the production process, but is not limited thereto. The aqueous medium may include the aqueous medium that is used in the production process, but is not limited thereto. In the present production method, the present foam-like body is collected on the aqueous medium. This foam-like body can be solid-liquid separated and dried, as necessary.

EXAMPLES

The present invention is explained below in greater detail with reference to examples thereof, but the present invention is not limited to the below-described examples. Explained in the examples below is the production of carbon nanohorns by the production method in accordance with the present invention using the production apparatus in accordance with the present invention.

Example 1

The present example is explained as a preferred example of the apparatus 2 for producing a carbon nanomaterial which is shown in FIG. 1. The graphite positive electrode 22 and the negative electrode 24 are disposed in the aqueous medium tank 10 with a water depth of about 30 cm so that the electrodes face each other in the vertical direction in relation to force of gravity at a distance of 1 mm from each other. The graphite positive electrode has a cylindrical shape with a diameter of 6 mm and a length of 100 mm and is obtained using 7 g of carbon rods with a carbon purity of 99.999%. The aqueous medium tank is filled with 30 L of aqueous solution, and the aqueous medium tank is then sealed with a lid. A DC voltage of 20 V, 140 A is applied to the graphite positive electrode and the negative electrode. Carbon nanohorns are then synthesized by supplying nitrogen gas at 5 L/min at the initial stage of arc discharge (3 sec to 5 sec) to the introducing path 46 of the inert gas supply system 44 in the negative electrode 24, and then, after the arc has been stabilized, introducing nitrogen gas at a set value (20 L/min to 25 L/min) and introducing nitrogen gas at a set value (10 L/min) also into the inert gas supply system 48 provided outside the negative electrode.

Figure 6:
FIG. 6 is a photograph of carbon nanohorns of a foam-like body obtained in an example.

In this period of time, the height of the support section supporting the negative electrode 24 is automatically adjusted to maintain a gap of 1 mm between the graphite positive electrode and the negative electrode. A foam-like product located in the vicinity of water surface in the aqueous medium tank 10 is continuously sucked in with a pump and passed through an UF filtration membrane to filter water and particles. The filtered particles are dried in a spray drier and purified particles are obtained. Observations of the particles under an electron microscope confirm that the particles include a large number of single-walled carbon nanohorns. The period of time in which 80% of the carbon rod is consumed is about 30 sec, about 4.0 g of carbon nanohorns are obtained per 1 min. Carbon nanohorns are also separately obtained from the gas phase located above the aqueous medium W of the aqueous medium tank 10 and from the aqueous medium W. Those carbon nanohorns are also confirmed by microscopic observations to be single-walled carbon nanohorns. FIG. 6 shows a photo of carbon nanohorns of a foamed-like body.

A particle size distribution of the foam-like carbon nanohorns obtained from the vicinity of surface of the aqueous medium W in the aqueous medium tank 10 is measured. In order to measure the particle size distribution, the carbon nanoparticles are dispersed using Newcol 740 (concentration 60%), which is a nonionic surfactant. The particle size distribution of the carbon nanohorns obtained in the present example is as follows: 10% cumulative diameter is 0.0712 μm, 90% cumulative diameter is 0.4675 μm, cumulative median diameter (50%) is 0.1539 μm, average diameter is 0.0834 μm, and standard deviation is 0.1357. Meanwhile, when no surfactant is used, the standard distribution is not followed and 10% cumulative diameter is 0.1227 μm, 90% cumulative diameter is 4.9431 μm, cumulative median diameter (50%) is 0.3493 μm, average diameter is 0.1093 μm, and standard deviation 0.5373.

As described hereinabove, carbon nanoparticles can be obtained in a larger (by a factor of 20 to 100 or higher) amount per one apparatus than with the conventional method for producing carbon nanoparticles by arc discharge. Further, no large-scale equipment is required and the space can be produced by 0.25 m² per one apparatus. Thus, carbon nanoparticles can be produced efficiently and at a low cost. Further, it is possible to produce carbon nanoparticles with arranged particle size such that the particle size distribution follows the standard distribution.

As indicated hereinabove, a carbon nanomaterial can be produced efficiently with the present production apparatus and the present production method.

Example 2

In the present example, the electric conductivity of the carbon nanohorns obtained in Example 1 is estimated. A plurality of types of buckypaper is fabricated by the following method by using commercially available carbon nanotubes (purity 99%, Baytubes (trade name), manufactured by Bayer) and the carbon nanohorns obtained in Example 1.

Thus, buckypaper 1 (thickness 37 μm) is fabricated by preparing a carbon nanotube dispersion in which carbon nanotubes are dispersed in deionized water or pure water by ultrasonic treatment by using appropriate gum arabic, subjecting the dispersion to solid-liquid separation, as appropriate, by centrifugal separation to adjust the concentration (0.2 wt %), then filtering under 6 atm, and drying the carbon nanotubes separated on a polycarbonate filter (pore diameter 0.45 μm) under reduced pressure at room temperature (about 20° C. to 23° C.).

Buckypaper 2 is fabricated by using a carbon nanohorn dispersion of Example 1 that has been acquired from the vicinity of surface of the aqueous medium W dispersed in ethanol by ultrasonic treatment, subjecting the dispersion to solid-liquid separation, as appropriate, by centrifugal separation to adjust the concentration (0.2 wt %), then filtering under 6 atm, and drying the carbon nanohorns separated on a polycarbonate filter (pore diameter 0.45 μm) under reduced pressure at room temperature (about 20° C. to 23° C.).

Buckypaper 3 (thickness 125 μm) is fabricated by using the abovementioned carbon nanotube dispersion and a carbon nanohorn dispersion acquired from the vicinity of surface of the aqueous medium W in Example 1, adjusting the concentration thereof, as appropriate, to obtain a carbon nanohorns: carbon nanotubes ratio of 1:1 (weight ratio), preparing a total of 0.2 wt % of dispersion, filtering the dispersion in the same manner as in the fabrication of Buckypaper 1, and drying under reduced pressure at room temperature (about 20° C. to 23° C.).

Buckypaper 4 (thickness 228 μm) is fabricated by supplying the carbon nanohorn dispersion (0.2 wt %) of Example 1 that has been acquired from the gas phase above the aqueous medium W dispersed in ethanol by ultrasonic treatment, which has been prepared in fabrication of buckypaper 2, to the buckypaper 1 prepared on the polycarbonate filter (pore diameter 0.45 μm), filtering under 6 atm, infiltrating in the carbon nanotubes, and drying under reduced pressure at room temperature (about 20° C. to 23° C.).

Buckypaper 5 (thickness 127 μm) is fabricated by supplying the carbon nanohorn dispersion (0.2 wt %) of Example 1 that has been acquired from the aqueous medium W dispersed in ethanol by ultrasonic treatment, which has been prepared in fabrication of buckypaper 2, to the buckypaper 1 prepared on the polycarbonate filter (pore diameter 0.45 μm), filtering under 6 atm, infiltrating in the carbon nanotubes, and drying under reduced pressure at room temperature (about 20° C. to 23° C.).

The surface resistance (Ω), sheet resistance (Ω/sq), resistance (Ωcm), and electric conductivity (S/cm) are measured with respect to the buckypaper of those types. With respect to the infiltrated buckypapers 4 and 5, the measurements are performed on the front surface (side infiltrated with carbon nanohorns) and the rear surface (carbon nanotube side). The results are shown in Table 1.

TABLE 1

| Kind of Buckypaper | Measurement site | Thickness μm | Surface resistance average, Ω | Sheet resistance Ω/sq | Resistance Ω cm | Electric consuctivety S/cm |
|---|---|---|---|---|---|---|
| 1 | | 37 | 1.29 | 6.8 | 0.025 | 40 |
| 2 | | | | | | |
| 3 | | 125 | 3.5 | 15.66 | 0.195 | 5.13 |
| 4 | surface | 228 | 10.3 | 50.56 | 1.15 | 0.87 |
|   | bottom |   | 5.5 | 25.07 | 0.57 | 1.75 |
| 5 | surface | 127 | 9.7 | 44.42 | 0.56 | 1.79 |
|   | bottom |   | 4 | 18.9 | 0.24 | 4.17 |

As shown in Table 1, the buckypaper cannot be fabricated only from the carbon nanohorns (buckypaper 2). Meanwhile, the moldability and strength of the buckypapers 4 and 5 were improved over those of the buckypaper 1 serving as a reference. The buckypapers 4 and 5 and also the buckypaper 3 have a strength similar to that of the buckypaper serving as a reference.

The resistance of the buckypaper 3 increases and electric conductivity decreases with respect to those of the buckypaper 1 serving as a reference. For the buckypapers 4 and 5, the resistance as a whole also increases and the conductivity decreases with respect to those of the buckypaper 1. This trend is particularly remarkable at the front surface (side infiltrated with the carbon nanohorns).

As described hereinabove, the carbon nanohorns obtained in Example 1 have an electric conductivity lower than that of the carbon nanotubes, but when the carbon nanohorns are infiltrated in the carbon nanotubes, the mechanical strength and moldability of the carbon nanotubes are effectively improved.

Example 3

In the present example, friction properties of the carbon nanohoms obtained in Example 1 are evaluated. Thus, a friction coefficient μ in a low-load range is measured between two steel plates. The following device and method are used for the measurements.

1. Device

Steel gauge block: length 4 mm (weight 8 g), 5 mm (weight 10 g), 10 mm (weight 21 g), 20 mm (weight 49 g), and 30 mm (weight 73 g); stainless steelx90CrMoV18; surface hardness 56HRC; Rz=0.1 μm.

Steel base: stainless steelx90CrMoV18; surface hardness 56HRC; Rz=0.1 μm.

Spring meter: 1 g to 8 g/1 N to 40 N (Correx).

Force sensor: Transcal 7280 (up to 20 N) (Burster).

Digital meter: digital meter manufactured by Maul.

PELT meter: roughness and topography measurements (Mahr).

2. Method

The weight of the gauge block is measured with the digital meter. Then the surface roughness of the gauge block and the steel base is measured with the PELT meter, and then the friction force at the dry surface of the steel base is measured with the spring meter. Carbon nanohorns are then scattered over the steel base, a gauge block is placed thereupon, and a friction force FR is measured with a force sensor. The friction coefficient μ is determined by the following Equation (1) by using the weight of the gauge block and the measured friction force FR. The results are shown in Table 2.

$$F_R[N] = \mu F_N[N] \quad [E1]$$

TABLE 2

| Gage block size (mm) | m (kg) | FR(N) dry | μ dry | FR(N + CNH) | μ + CNH |
|---|---|---|---|---|---|
| 4 | 0.008 | 0.01 | 0.12 | 0.06 | 0.75 |
| 5 | 0.01 | 0.015 | 0.14 | 0.08 | 0.8 |
| 10 | 0.021 | 0.02 | 0.096 | 0.17 | 0.8 |
| 20 | 0.049 | 0.04 | 0.08 | 0.43 | 0.9 |
| 30 | 0.073 | 0.07 | 0.096 | 0.7 | 0.95 |

As shown in Table 2, for all of the specimens, the friction coefficient μ (dry) is about 0.1, and the friction coefficient μ (carbon nanohorns are present) is 0.84. Thus, the friction coefficient in a low-load range (0.008 kg to 0.073 kg) is about 8 times that in a dry state. The results presented above indicate that the present carbon nanomaterial can be used as a friction material.

The specific examples of the present invention are described above in detail, but those are merely illustrating examples and place no limitation on the claims. The features set forth in the claims include various changes and modifications of the above-described specific examples.

Furthermore, the technical elements explained in the present description or illustrated by the drawings demonstrate technical usefulness independently or in various combinations thereof and shall not be limited to the combinations described in the claims at the time of filing. Further, the techniques illustrated by the present description and the drawings are to achieve a plurality of objectives at the same time, and technical usefulness is exhibited by attaining any one of such objectives.

Example 4

The present example relates to the recovery of a radioactive substance (radioactive aerosol).

The present carbon nanomaterial is evaluated with respect to absorption of radiation by absorption of electromagnetic waves by the CNH from a low-frequency band to a high-frequency band (GHz order). The carbon nanohorns of the foam-like body produced in Example 1 are used as the carbon nanomaterial for the evaluation.

1. Test for Verifying Radiation Absorption (Attenuation) Effect (1) Preparation of Test Specimen (Example Filter)

A nonwoven fabric is coated with carbon nanohorns at 14.4 g/m$^2$ per unit to prepare a carbon nanohorn filter (example filter). A reference filter is the nonwoven fabric that is not coated with the carbon nanohorns.

(2) Test Method

A radiation dose (total of α rays, γ rays, and β rays) inside and outside of a lead box is measured with a dosimeter (manufactured by Kenis Co., No. 121-415, simple radiation detector) by using the lead box equipped with an openable lid (the box is prepared separately) under an environment in which space radiation (average value 2.31 μSv/h (upper limit 3.07 μSv/h, lower limit 1.55 μSv/h) can be detected.

First, the radiation dose is measured for 3 min in the vicinity of the outer section of the lead box, and then the lid of the lead box is removed, the dosimeter is placed into the lead box, and the radiation dose is measured again for 3 min.

The radiation dose is then measured again for 3 min in the vicinity of the outer section of the lid, the dosimeter is thereafter placed into the lead box, a reference filter that is not coated with the carbon nanohorns is air-tightly fixed to the opening of the lead box, instead of the lead box lid, and the radiation dose is measured after 3 min.

The radiation dose is further measured for 3 min in the vicinity of the outer section of the lead box, the dosimeter is then placed into the lead box, the test filter that has been coated with the carbon nanohorns is air-tightly fixed to the opening of the lead box, instead of the lead box lid, and the radiation dose is measured after 3 min.

The results are shown in the table.

TABLE 3

|  | Measurement site | μSv/h | Shield dose (μSv/h) (Shield rate) |
|---|---|---|---|
| Lead box opened | outside | 1.59 | 1.01 (63.5%) |
|  | inside | 0.58 |  |
| Reference filter mounted | outside | 1.58 | 0.9 (62.2%) |
|  | inside | 0.6 |  |
| Example filter mounted | outside | 1.89 | 1.37 (72.5%) |
|  | inside | 0.52 |  |

As shown in Table 3, when the reference filter is mounted on the lead box, the radiation dose measured inside the lead box is practically the same as that when the lead box is open, and the reference filter does not demonstrate any radiation absorption ability (attenuation ability). Thus, inside the lead box partitioned by the comparative filter, 62.5% of radiation is shielded, which is about the same as the radiation shielding ratio (63.5%) inside the lead box when the lead box is open, and no significant difference can be observed.

By contrast, with the example filter, the dose inside the lead box is 0.52 μSv/h, which is by 1.37 μSv/h less than the dose measured outside of the lead box. Thus, inside the lead box, partitioned by the example filter, 72.5% of radiation is shielded. The results presented above demonstrate that the carbon nanohorns adsorb (shield or attenuate by adsorption) radioactive substances (radiation).

Example 5

Carbon nanohorns of the foam-like body produced in Example 1 are coated (0.64 g/m$^2$) on the surface of Nylon nonwoven fabric (spunbond) with a surface area of 0.6258 m$^2$. A Ra226 standard substance (0.4 μCi (Curie)), which is a radioactive substance, is wrapped up in the nonwoven fabric, radiation emitted from the standard substance is measured with a dosimeter (manufactured by RIKEN KEIKI CO., LTD., MODEL SUM-AD8), and the radiation doses measured before and after the standard substance is wrapped up are compared. The results obtained confirm that the radiation dose measured before the standard substance is wrapped up is 0.4 μCi, but wrapping in the nonwoven fabric coated with the carbon nanohorns results in the decrease of the dose to 0.175 μCi. Thus, the carbon nanohorns effectively absorb or attenuate the radiation.

Example 6

Figure 7:
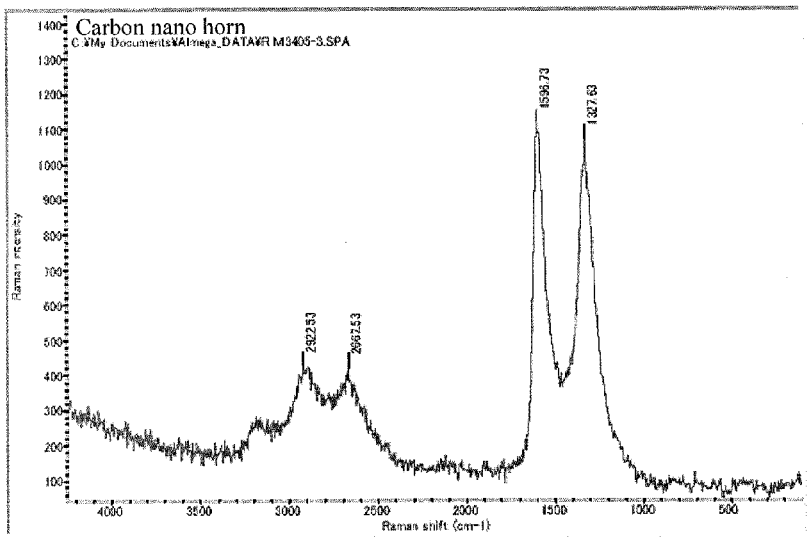
FIG. 7 shows Raman spectroscopy results relating to carbon nanohorns of a foam-like body obtained in an example.
Figure 8:
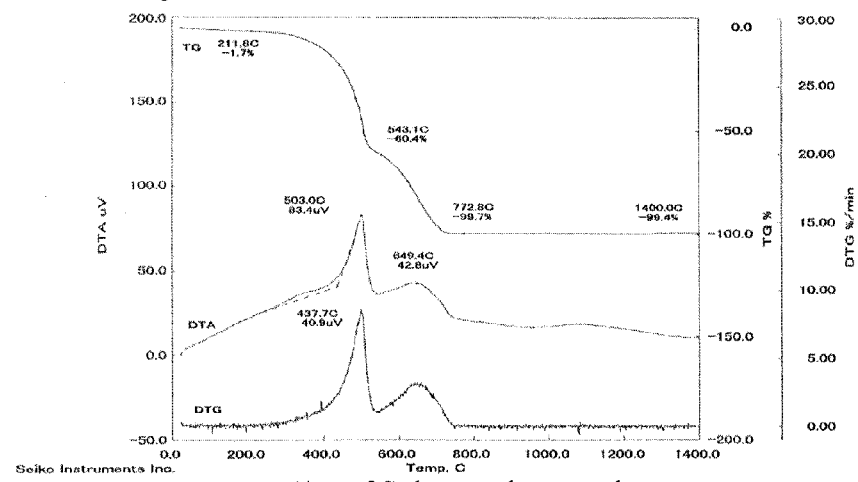
FIG. 8 shows TG-DTA results relating to carbon nanohorns of a foam-like body obtained in an example.

In the present example, Raman spectroscopy and simultaneous thermogravimetry and differential thermal analysis are performed with respect to the carbon nanohorns of the foam-like body produced in Example 1. The results are shown in FIG. 7 and FIG. 8. As shown in FIG. 7, according to the Raman spectroscopy, the G/D ratio is superior to that obtained for the conventional carbon nanohorns obtained by the arc discharge. Thus, the G/D ratio is not less than 1.0 (higher than 1.0). As shown in FIG. 8, according to simultaneous thermogravimetry and differential thermal analysis, two-stage weight reduction follows heat generation at 200° C. to 770° C., and endothermic peaks appear at 503° C. and 649° C.

The invention claimed is:

1. An apparatus for producing a carbon nanomaterial, comprising:
   an aqueous medium tank accommodating an aqueous medium;
   a negative electrode at least partially immersed in the aqueous medium;
   a positive electrode disposed, in the aqueous medium, opposite a part of the negative electrode that is immersed in the aqueous medium at a distance therefrom;
   an arc discharge generating mechanism that applies a voltage to enable formation of an arc discharge generation region in a gap formed by the negative electrode and the positive electrode facing each other;
   an inert gas cavity forming mechanism that introduces an inactive gas into the gap from a side that is outside of the negative electrode and lateral to the gap, and optionally from a side of the negative electrode, and forms an inert gas cavity around the gap in the aqueous medium; and
   a mechanism that recovers the carbon nanomaterial synthesized from a carbon material preliminary arranged in the arc discharge generation region, wherein
   the inert gas cavity forming mechanism is configured to form the inert gas cavity by direct shielding in the aqueous medium by introducing the inert gas into the gap at least from the side that is outside of the negative electrode and lateral to the gap, and
   the arc discharge generating mechanism is configured to form the arc discharge generation region in the inert gas cavity and synthetize the carbon nanomaterial.

2. The production apparatus according to claim 1, wherein the negative electrode does not have a partition wall that surrounds the arc discharge generation region.

3. The production apparatus according to claim 1, wherein the gap between the positive electrode and the negative electrode is equal to or more than 1 mm and equal to or less than 2 mm.

4. The production apparatus according to claim 1, wherein the mechanism that recovers the carbon nanoparticles includes:
   a mechanism that sucks in the aqueous medium including carbon nanoparticles;
   a mechanism that separates the carbon nanoparticles from the aqueous medium; and
   a mechanism that dries the separated carbon nanoparticles.

5. The production apparatus according to claim 1, wherein the carbon nanomaterial is in a form of a foam-shaped body.

6. The production apparatus according to claim 1, the aqueous medium tank is configured to be sealed.

7. The production apparatus according to claim 1, wherein the inert gas cavity forming mechanism is configured to form the inert gas cavity that is surrounded by the aqueous medium.

8. A method for producing a carbon nanomaterial, the method comprising:
   synthesizing the carbon nanomaterial by generating arc discharge in an inert gas cavity formed in an aqueous medium by introducing an inert gas into a gap formed between a negative electrode and a positive electrode in the aqueous medium from a side that is outside of the negative electrode and lateral to the gap, and optionally from a side of the negative electrode, wherein the inert gas also forms the inert gas cavity around the gap, and generating carbon vapor from a carbon material preliminary arranged in the inert gas cavity, thereby synthetizing a carbon nanomaterial; and
   recovering the carbon nanomaterial,
   wherein the inert gas cavity is formed by direct shielding by introducing the inert gas into the gap at least from the side that is outside of the negative electrode and lateral to the gap.

9. The production method according to claim 8, wherein the recovering includes recovering the carbon nanomaterial in a form of a foam-shaped body located on the aqueous medium.

10. The production method according to claim 8, wherein the recovering includes recovering the carbon nanomaterial located in the aqueous medium.

11. The production method according to claim 8, wherein the recovering includes recovering the carbon nanomaterial located in a gas phase on the aqueous medium.

* * * * *